United States Patent
Rockwell, Jr.

[11] Patent Number: 6,159,576
[45] Date of Patent: Dec. 12, 2000

[54] FLOOR MAT SOLELY COMPRISED OF MONOFILAMENT NYLON FIBER AND HAVING AN OZONE RESISTANT, NON-STAINING RUBBER BACKING SHEET

[75] Inventor: James N. Rockwell, Jr., LaGrange, Ga.

[73] Assignee: Milliken & Company, Spartanburg, S.C.

[21] Appl. No.: 09/113,842

[22] Filed: Jul. 10, 1998

Related U.S. Application Data

[63] Continuation-in-part of application No. 08/989,091, Dec. 11, 1997.

[51] Int. Cl.[7] .................. B32B 3/02; D03D 3/00
[52] U.S. Cl. ............... 428/95; 428/82; 428/96; 428/97; 428/229; 260/42.33
[58] Field of Search .................. 428/95, 96, 97, 428/82, 229; 260/42.33

[56] References Cited

U.S. PATENT DOCUMENTS

| | | | |
|---|---|---|---|
| 1,008,618 | 11/1911 | Skowronski et al. | |
| 3,306,808 | 2/1967 | Thompson et al. | 161/66 |
| 4,045,605 | 8/1977 | Breens et al. | 428/88 |
| 4,111,897 | 9/1978 | Black | 260/42.33 |
| 4,353,944 | 10/1982 | Tarui | 428/74 |
| 4,447,201 | 5/1984 | Knudsen | 425/397 |
| 4,587,148 | 5/1986 | Campbell et al. | 428/88 |
| 4,711,191 | 12/1987 | Schwartz | 112/410 |
| 4,741,065 | 5/1988 | Parkins | 15/217 |
| 4,820,566 | 4/1989 | Heine et al. | 428/88 |
| 4,886,692 | 12/1989 | Kerr et al. | 428/82 |
| 4,997,880 | 3/1991 | Van Der Groep | 525/57 |
| 5,055,333 | 10/1991 | Heine et al. | 428/88 |
| 5,102,713 | 4/1992 | Corbin et al. | 428/92 |
| 5,154,961 | 10/1992 | Reuben | 428/82 |
| 5,227,214 | 7/1993 | Kerr et al. | 428/95 |
| 5,284,009 | 2/1994 | Tung et al. | 57/239 |
| 5,305,565 | 4/1994 | Nagahama et al. | 52/177 |
| 5,887,416 | 3/1999 | Shimono et al. | 57/236 |
| 5,902,662 | 5/1999 | Kerr | 428/95 |

FOREIGN PATENT DOCUMENTS

| | | |
|---|---|---|
| 1211755 | 10/1959 | France . |
| 2-112437 | 4/1990 | Japan . |
| 614853 | 7/1976 | Switzerland . |
| WO 95/30040 | 11/1995 | WIPO . |
| WO 96/37645 | 11/1996 | WIPO . |

*Primary Examiner*—Terrel Morris
*Assistant Examiner*—Christopher C. Platt
*Attorney, Agent, or Firm*—Terry T. Moyer; William S. Parks

[57] ABSTRACT

This invention relates to a floor mat primarily for use in an outdoor environment wherein the mat includes a tufted carpet solely comprised of nylon monofilament fibers. Furthermore, this mat comprises a foam rubber backing which possesses a high level of ozone resistance and simultaneously will not appreciably stain a handler's skin or a floor's surface with carbon particles. The utilization of all monofilament nylon fibers provides for the extreme effective removal of moisture, dirt, and debris from the footwear of pedestrians and also permits easy cleaning and effective drying of the overall article. The utilization of a foam rubber backing also allows for heavy duty industrial-scale laundering in such standard washing machines without appreciably damaging either the washing machines or inventive floor mats themselves.

15 Claims, 2 Drawing Sheets

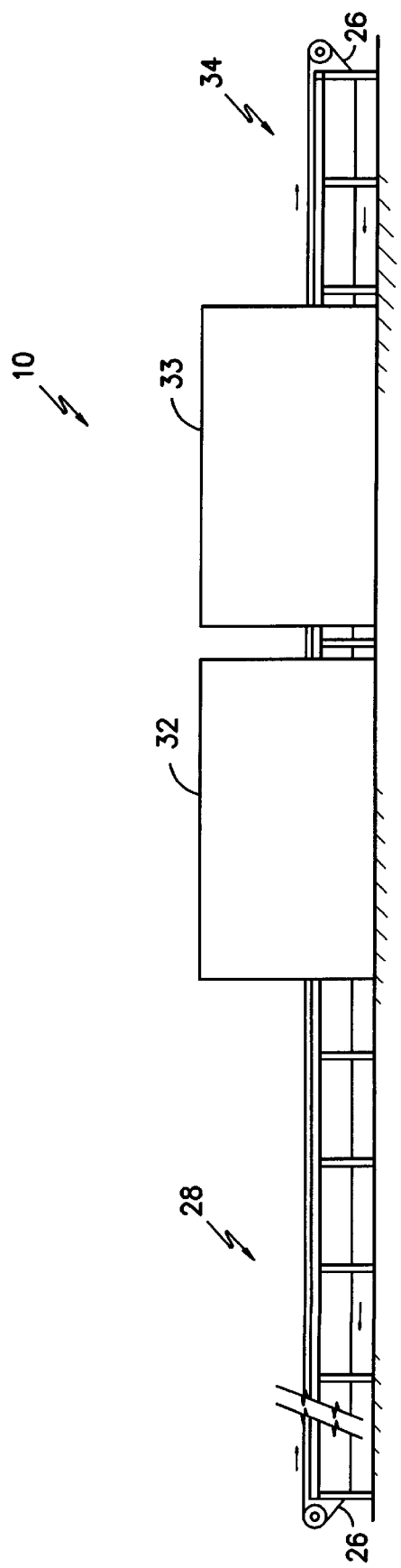

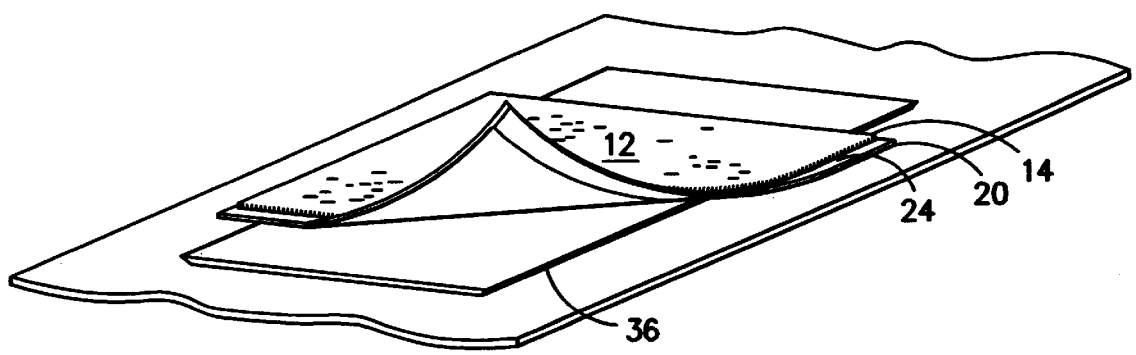
FIG. -2-
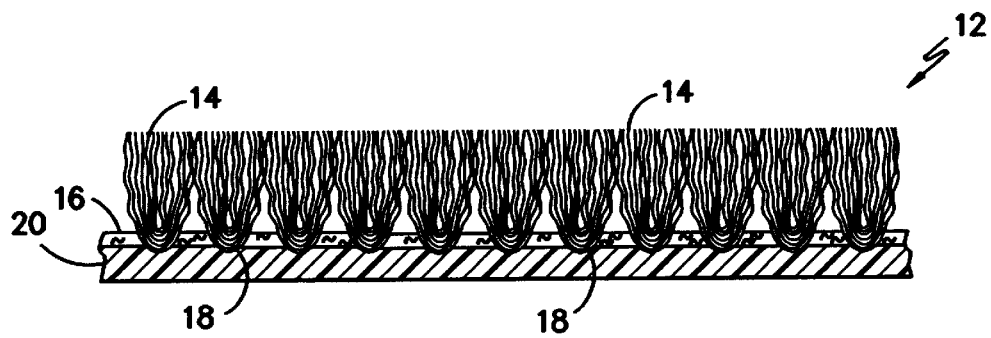
FIG. -3-

FLOOR MAT SOLELY COMPRISED OF MONOFILAMENT NYLON FIBER AND HAVING AN OZONE RESISTANT, NON-STAINING RUBBER BACKING SHEET

CROSS-REFERENCE TO RELATED APPLICATION

This application is a continuation-in-part of co-pending application of U.S patent application Ser. No. 08/989,091, filed on Dec. 11, 1997 pending of Thomas D. Nord et al. for Multistep Building Entryway Barrier Floor Covering Combination. This application is incorporated herein by reference.

FIELD OF THE INVENTION

This invention relates to a floor mat primarily for use in an outdoor environment wherein the mat includes a tufted carpet solely comprised of nylon monofilament fibers. Furthermore, this mat comprises a foam rubber backing which possesses a high level of ozone resistance and simultaneously will not appreciably stain a handler's skin or a floor's surface with carbon particles. The utilization of all monofilament nylon fibers provides for the extremely effective removal of moisture, dirt, and debris from the footwear of pedestrians and also permits easy cleaning and effective drying of the overall article. The utilization of a foam rubber backing also allows for periodic heavy duty industrial-scale laundering in such standard washing machines without appreciably damaging the inventive floor mat.

DISCUSSION OF THE PRIOR ART

Floor mats have long been utilized to facilitate the cleaning Of the bottoms of people's shoes, particularly in areas of high pedestrian traffic such as doorways. Moisture, dirt, and debris from out of doors easily adhere to such footwear, particularly in inclement weather and particularly in areas of grass or mud or the like. Such unwanted and potentially floor staining or dirtying articles need to be removed from a person's footwear prior to entry indoor. As will be appreciated, such outdoor mats by their nature must undergo frequent repeated washings and dryings so as to remove the dirt and debris deposited thereon during use. These mats are generally rented from service entities which retrieve the soiled mats; from the user and provide clean replacement mats on a frequent basis. The soiled mats are thereafter cleaned and dried in an industrial laundering process and then sent to another user in replacement of newly soiled mats.

Such floor mats have had at least three significant problems arising from frequent washings and harsh environments of use. First, the energy required to wash and dry a typical floor mat is significant due to the overall mass of the mats. This overall mass is made up of the mass of the mat pile, the mass of the carrier fabric into which the mat pile is tufted, and most significantly, the mass of the rubber backing) sheet which is integrated to the carrier fabric under heat and pressure. As will be appreciated, a reduction in the overall mass of the floor mat will result in a reduced energy requirement in washing and drying the mat. Moreover, a relative reduction in the mass of the rubber backing sheet (i.e. the heaviest component) will provide the most substantial benefit. The floor mat of the present invention includes a rubber backing sheet which may possess a specific gravity which is approximately 25 percent less then the rubber sheets of typical prior floor mats. Accordingly, the overall energy requirements associated with the cleaning and handling of these mats is substantially reduced over that of prior mats. Furthermore, the tufted carpet pile of the inventive mats is comprised of all nylon monofilaments which facilitates drying of the mat upon exposure to standard environmental temperatures (i.e., 25° C.). In this manner, the necessity of drying such articles within an industrial drying machine is overcome, again translating into a reduction of the energy requirements required to properly clean the inventive mats.

The second problem which is encountered is the deterioration of the carbon—carbon double bonds in the matrix of the rubber backing sheet due to the exposure of the sheets to an oxidizing environment during use and cleaning. Specifically, the exposure of the mats to oxidizing agents during the washing and drying process tends to cleave the carbon—carbon double bonds of the rubber sheet thereby substantially embrittling the rubber which leads to cracking under the stress of use. In addition to the laundering process, the exposure of the mats to oxygen and ozone, either atmospheric or generated, during storage and use leads to cracking overtime. The mat of the present invention incorporates a rubber backing sheet which provides enhanced protection against oxygen as measured by standard ozone resistance tests and is thereby believed to substantially prolong the useful life of the mat. Accordingly, the mat of the present invention represents a useful advancement over the prior art.

The third major problem has been the staining ability of such rubber backed mats upon contact with various surfaces, such as concrete, wood, and a handler's skin, just to name a few. The carbon particles within the rubber backing sheet of such mats become disassociated and thus easily rub off upon contact with many different surfaces. The inventive mat has remedied this problem through a specific rubber/polymer additive formulation within the backing sheet component. Such a remedy has not been taught or fairly suggested within the prior art to date.

Floor and/or dust mats, in particular those having a tufted carpet pile partially comprised of coarse multifilament fibers, have been developed which provide in easy manner of cleaning the soles of a person's shoes simply by scraping the footwear against such a stiff article. Examples of such floor mats are exemplified in U.S. Pat. No. 1,008,618, to Skowronski et al., U.S. Pat. No. 4,045,605, to Breens et al., and U.S. Pat. No. 4,353,944, to Tarui, as well as French Patent No. 1,211,755, assigned to Cosyntex (S.A.) and PCT Application 95/30040, assigned to Kleen-Tex Industries, Inc. Although coarse fibers have been disclosed for floor mats, there are no prior art references which teach nor fairly suggest the presence of all monofilament nylon fibers.

Further improvements over the basic all-coarse (but not all-monofilament) mats included interspersed coarse and fine carpet pile yarns, either in stripe or checkerboard patterns, as taught by U.S. Pat. Nos. 4,820,566 and 5,055,333, both to Heine et al., or in separate regions of the same article, as in Tarui and Kleen-Tex, above. All of the aforementioned patents documents are incorporated herein by reference. Nowhere in the prior art is an industrially launderable floor mat comprised solely of monofilament nylon fibers and further comprising a either a solid or foam rubber backing including ozone resistance components which does not appreciably stain a handler's skin or a floor's surface disclosed or fairly suggested. The only ozone resistance backing sheet taught within the prior art is European Patent 702,929, to Milliken Research Corporation. This reference does not teach that same proportions of rubber to EPDM additive so as to also provide stain reduction, however. As a result, a need exists for such an improvement, easily laundered or cleaned, nylon monofilament floor mat having a, rubber backing which is ozone resistant and which will not appreciably stain contacted surfaces.

DESCRIPTION OF THE INVENTION

It is thus an object of this invention to provide a floor mat for primary use in an indoor environment which allows for maximum scraping and thus cleaning of a pedestrian's footwear. Furthermore, it is an object of the invention to provide an outdoor floor mat which possesses suitable flexibility to withstand periodical laundering in industrial washing machines and which will efficiently and effectively become dry upon exposure to air after a short period of time. Still a further object of this invention is to provide an outdoor mat which will not easily degrade due to continuous exposure to ozone, both in an outdoor environment and during industrial washing processes. Yet another object of the invention is to provide a outdoor mat which will not transfer carbon particles in an appreciable amount from its rubber backing to any surfaces in which it comes into contact.

Accordingly, this invention encompasses a floor mat comprising a carrier fabric;

a pile material tufted into the carrier fabric which forms a pile surface on one side of the carrier fabric, wherein said pile material is comprised of all monofilament nylon fibers having deniers of from about 200 to about 400; and a vulcanized expanded backing sheet of rubber integrated to the other side of the carrier fabric, wherein said rubber backing is comprised of a mixture of rubber compounds selected from the group consisting essentially of NBR and EPDM, SBR and EPDM, and SBR, NBR, and EPDM; and optionally, a blowing agent to produce a closed cell structure foam rubber;

wherein said floor mat possesses suitable flexibility to be laundered on a regular basis in a standard industrial washing machine without appreciably damaging said mat or said machine; and wherein said floor mat will not transfer an appreciable amount of carbon particles from said rubber backing sheet to any surfaces in which it comes into contact.

The inventive mat is primarily for outdoor use. The composition of the turfted carpet (all monofilament nylon fibers) facilitates drying of the mat upon exposure to precipitation. Furthermore, heavy rains which may produce running water through such a mat, will not become trapped within the carpet either. Such a configuration provides an outdoor mat which will not retain a substantial amount of rainwater. A s a result, the inventive mat will not become saturated with moisture and thus will continue effectively to remove dirt and debris from pedestrian' footwear shortly after exposure to precipitation. Furthermore, the inventive mat is well-suited for outdoor use because of its resistance to ozone. Exposure to the elements in an outdoor environment usually increases the degradation of rubber articles. The utilization of a certain amount of ethylene-propylene diene comonomer rubber (EPDM) aids in reducing this rate of degradation due to ozone exposure. However, EPDM is cost prohibitive for use within floor mat backings. It was therefore necessary to develop a more cost-effective rubber backing which possessed the maximum degree of ozone resistance. Furthermore, since the inventive mat would be handled often, would necessarily undergo periodic industrial cleaning, and would remain on surfaces which could be discolored by standard rubber compositions, it was also important to consider these criteria during the development of the proper rubber backing for the inventive mat.

The inventive floor mat generally comprises a tufted carpet pile of nylon monofilament fibers attached to the rubber sheet which has been vulcanized. A related, although by no means identical or similar, floor mat comprised of a tufted carpet pile on a vulcanized rubber sheet is exemplified in U.S. Pat. No. 5,585,565, to Nagahama et al., hereby entirely incorporated by reference, except that the inventive article comprises specific ozone resistance characteristics which are neither taught nor fairly suggested by patentee. For the inventive floor mat, the attachment of the rubber sheet to the monofilament nylon carpet ?pile can be accomplished during the actual vulcanization step, as taught in Nagahama, for example, above, or through the use of an adhesive layer, preferably a polyolefin adhesive, between the carpet pile and and the rubber sheet, as disclosed in copending U.S. patent application Ser. No. 08/732,866, hereby entirely incorporated by reference.

The utilization of all monofilament nylon fibers having deniers from 200 to 400 within the tufted carpet component of the inventive provides an excellent surface to which the majority of the potential moisture, dirt, and debris from pedestrians' shoes will be transferred upon scraping. When such a mat is utilized outside an edifice, the majority of unwanted dirt, debris, and the like, will become trapped within the article and will not be transferred to the shoes of a subsequent pedestrian, thus preventing the potential "retracting" of moisture, dirt, and debris through the interior. A more effective way of cleaning and scraping a pedestrian's shoes as well as the insurance that the interior of an edifice will remain clean are thus provided.

With such uniformly coarse fibers, the dirt and grim( removed from a pedestrian's footwear is easily trapped; however, upon washing, such debris is also easily removed from the mat. Furthermore, such monofilament fibers do not require the need for drying in industrial drying machines as any excess moisture picked up in a washing vessel will easily evaporate from the surface of such nylon fibers upon exposure to ambient temperature (i.e., 25° C.). This characteristic of the inventive mat therefore also translates into cost reductions foil the consumer as only a washing procedure is required in order to clean the article effectively. Additionally, with such monofilament fibers, rainwater will not become trapped in any appreciable amount and, in fact, will easily pass through the tufted carpet portion. Again, upon exposure to ambient temperature, any excess rainwater left on the mat will quickly and easily evaporate from the surface, resulting in a floor mat which retains the ability to fully function as it was intended without the need to be dried on an industrial scale prior to reuse.

The term denier, as it applies to yarns, refers to the weight of a fiber in grams having a length of 9,000 meters. The specific range of suitable deniers for the inventive floor mat nylon monofilament fibers is between about 200 and 400 dpf. Preferably, the fibers have an average dpf of between about 300 and 400, while even more preferable is an average of about 300. In general, heavy, coarse fibers generally reside in a very wide range of deniers from about 100 to about 5,000 denier per filament ("dpf"). The preferred ranges noted above are thus in a rather narrow subrange. This subrange has been found to provide tile most effective cleaning, washing, and outdoor drying capabilities for the inventive mat. Also of great interest in developing this inventive mat was the fact that denier per fiber translates into an aggregate weight for the overall carpet pile. The amount of and weight of fibers within a tufted pile is therefore of great importance in order to keep the weight of the inventive mat at a sufficiently low level to facilitate cleaning in industrial laundering processes. By providing a lower overall weight for the inventive mat product, lower amounts of energy will be required to clean the mat in an industrial scale process which will translate into lower costs for the consumer. Thus, the carpet pile of the inventive mat should possess an average weight of between about 15 and 25 ounces per square yard, which a preferred average falling between about 19 and 22. These ranges translate into from about one to two million monofilament fibers per square yard, with a particularly preferred range being from about 1.45 to about 1.5 million.

The selection of all nylon monofilament fibers is critical within the inventive floor mat for a number of reasons. First of all, as noted above, mono filaments provide a stiffer surface for better scraping and thus removal of dirt and debris from a pedestrian's footwear. Nylon must be utilized because it withstands the high temperatures and pressures employed during the required vulcanization step in order to form the entire inventive mat. In the past, again as noted above, carpet pile surfaces for floor mats have incorporated both coarse and fine fibers of cotton, polypropylene, nylon, and the like, together. Such combinations of differing deniers are able to withstand the harsh conditions associated with vulcanization. even when fibers possessing relatively low melting points (such as polypropylene) are employed. However, all monofilament structures do not easily retain their form without at least becoming partially damaged or altered due to such vulcanization temperatures. The selection of nylon between 200 and 400 dpf is thus critical for providing a suitable mat which will not lose its ability to scrape or clean properly after being subjected to high vulcanization temperatures. Furthermore, in comparison with other fibers possessing similar high melting points, nylon is less expensive and thus its utilization would not translate into increased costs for the end user unlike the use of other, more expensive, high melting point, synthetic fibers.

As noted above, the inventive floor mat can easily be removed from the floor or ground and can be easily laundered through, preferably, industrial washing processes utilizing standard heavy duty washing machines. For this reason, the inventive floor mat must a backing sheet which possesses suitable flexibility so as not to damage such machinery (not to mention itself) when subjected to such rigorous cleaning procedures. Furthermore, the inventive floor mat also possesses a specific degree of ozone resistance which is necessary not only to combat degradation from exposure to outdoor environments, but also to protect the mat from degradation due to contact with harsh detergents, and the like, within such cleaning processes;. Although the inventive floor mat is produced preferably to withstand the rigors of industrial machine washing, hand washing and any other manner of cleaning may also be utilized. The inventive mat must only be able to withstand such industrial cleaning procedures. As a result, the inventive mat provides a long-lasting article which is easily cleaned, and thus remains aesthetically pleasing to users (i.e., pedestrians) over the life of the mat. All of this translates into reduced cost for the consumer as fewer mats need to be purchased in order to provide a suitable barrier to outdoor dirt and moisture.

BRIEF DESCRIPTION OF THE DRAWINGS

FIG. 1 is a schematic representation of a floor mat manufacturing machine.

FIG. 2 illustrates a molded floor mat as it exists the mat manufacturing machine of FIG. 1.

FIG. 3 is a partial cross-sectional view of a completed vulcanized floor mat.

DETAILED DESCRIPTION OF THE DRAWINGS

While the invention will be described in connection with certain preferred embodiments and practices, it is to be understood that it is not intended to in any way limit the invention to such embodiments and practices. On the contrary, it is intended to cover all alternatives, modifications and equivalents as may be included within the spirit and scope of the invention as defined by the appended claims.

Turning now to the drawings wherein like elements are designated by like reference numerals in the various views, in FIG. 1 is shown a schematic of a floor mat manufacturing machine 10 for producing the floor mat 12 (FIGS. 2 and 3) of the present invention. In the illustrated and preferred form of the invention, the floor mat 12 comprises pile monofilament yarns 14 of nylon tufted through a woven or nonwoven carrier layer 16 of suitable material with the bottom 18 of the tufts adhered to a rubber backing sheet 20. This adherence of the rubber backing sheet 20 to the carrier layer 16 and bottom of the tufts is effected during vulcanization (i.e. cross-linking) of the rubber backing sheet under heat and pressure as is well known to those of skill in the art. If desired, the bottom of the rubber backing sheet may also include a plurality of anti-creep cleats (not shown) as are well known in the art. As shown in FIG. 2, the floor mat 12 of the present invention also preferably includes a border portion 24 around the perimeter.

The floor mat 12 of the present invention is assembled molded and vulcanized on the manufacturing machine 10 of FIG. 1. The manufacturing machine 10 which is well known to those of skill in the art includes an endless, teflon coated conveyor belt 26 to carry the floor mats 12 from an assembly station 28, into a press molding apparatus 32, to a post cure oven 33 and out to a separating station 34. The press molding apparatus 32 can be of any type which is suitable such as that shown in U.S. Pat. No. 4,447,201 to Knudsen (incorporated by reference).

In production of the dust control mats 12 of the present invention, the mats are preassembled at station 28 by laying down a metal plate or silicone or butyl pad 36 on the conveyor belt 26. The rubber backing sheet 20 as described more fully below is placed over the silicone pad and the tufted fabric comprising the pile yarns 14 tufted through the carrier layer 16 is placed on top of the rubber backing sheet 20. In the preferred practice, the rubber backing sheet laid down at the assembly station 28 is a solid calendared sheet of green (i.e. unvulcanized) acrylonitrile-butadiene rubber (NBR) or styrene butadiene rubber (SBR) mixed with a polymer additive such that the ratio of the NBR or SBR to the polymer additive is between about 0.33 and 1.0.

The conveyor belt 26 is then indexed to place the preassembled mat into the press mold 32 while a second mat is preassembled at station 28. While the first mat is in the press mold 32, it is exposed to a temperature between about 280° F. and about 300° F. While in the press mold 32, the mat is exposed to pressures in the range of between about 20 psi and 40 psi. At the temperature and pressure occurring in the press mold 32, the rubber backing sheet 20 undergoes vulcanization and is integrated to the carrier layer 16 of the mat to form a substantially unitary structure. After about 3 to 6 minutes the conveyor belt 26 is again indexed to move the first vulcanized mat into a post cure oven 33 to complete the vulcanization but without the application of pressure. During this time yet a third mat is preassembled at station 28 while the second mat is indexed to the press mold.

In the preferred practice, the post cure oven is operated at a temperature between about 280° F. and 300° F. but no pressure is applied to the mat. After another 3 to 6 minutes, the conveyor belt is again indexed to move the first mat into the stripping station 34 wherein it is removed from the silicone pad and the conveyor belt 26 (FIG. 2) while the second, and third mats are indexed into the post cure oven 33, and the press mold 32 respectively, and a fourth mat is preassembled at station 28. As will be appreciated, the mat may also undergo a preheating operation prior to entering the press mold if desired as described in U.S. Pat. No. 4,886,692, to Kerr.

DETAILED DESCRIPTION OF THE INVENTION

As previously indicated, in the preferred embodiment of the present invention the base material for the rubber backing sheet 20 is acrylonitrile-butadiene rubber (NBR) or styrene-butadiene rubber (SBR). Other materials which may also be use d include, by way of example, hydrogenated NBR an d carboxylated NBR although the use of these materials may be cost prohibitive. As will be appreciated, the use of NBR or SBR is desirable from a cost perspective. However, these materials may be susceptible to oxidation and ozone attack (referred to as ozonation) due to the presence of unsaturated carbon—carbon double bonds. Moreover, the specific gravity of fully vulcanized NBR or SBR compositions is relatively high being in the range of about 1.2 to about 1.45 which may result in a relatively heavier overall mat structure.

The present invention makes use of fluxing technology to combine EPDM in formation of the rubber backing sheet 20 to provide enhanced resistance to oxidation and ozonation while at the same time yielding a lighter material through the addition of chemical blowing agents. Specifically, in the preferred embodiment, the rubber backing sheet 20 of the present invention comprises either NBR mixed with EPDM, and optionally with a blowing agent, in a fluxing operation or SBR mixed with EPDM, and optionally withal blowing agent, in a fluxing operation wherein the EPDM is mixed at a level such that the ratio of EPDM to the base rubber (NBR or SBR) is between about 3.0 (i.e. 75 parts EPDM and 25 parts base rubber) and about 1.0 (i.e. 50 parts EPDM and 50 parts polymer additive). Preferably, this ratio is about 1.5 (i.e. 60 parts EPDM and 40 parts base rubber). This fluxing operation preferably takes place in a standard rubber internal mixer such as a Banbury mixer which is well known to those of skill in the art at a temperature of about 280° F. to 300° F.

The rubber mixture is thereafter calendared as a solid sheet of unvulcanized material which is used in the manufacture of the floor mat 12 in the process as described above. In practice, the raw NBR is believed to be available from Miles Inc. Rubber Division in Akron, Ohio. The SBR may be purchased from Goodyear Tire and Rubber Company in Akron, Ohio. The EPDM may be purchased from Exxon Corporation under the trade designation Vistalon™.

In the preferred practice of the present invention, a masterbatch of the polymner components is first prepared by mixing the base rubber (either NBR or SBR) with the additive ozone resistant polymer (EPDM) in the desired ratio along with various stabilizers and processing agents. Exemplary compositions of the masterbatch for various additive ratios wherein EPDM is mixed with NBR are provided in Table 1A for ratios of NBR to the additive polymer of 9.0 (Column a), 2.3 (Column b) and 1.2 (Column c).

TABLE 1A

| | PARTS BY WEIGHT | | |
|---|---|---|---|
| MATERIAL | a | b | c |
| Rubber (NBR) | 40 | 25 | 50 |
| Additive Polymer (EPDM) | 60 | 75 | 50 |
| Plasticizer | 10 | 5 | 15 |
| Stabilizer | 2 | 2 | 2 |
| Processing Aid | 1.75 | 1.75 | 1.75 |
| Antioxidant | 1.2 | 1.2 | 1.2 |

In the preferred practice the plasticizer which is used is diisononylphthalate. The stabilizer is trinonylphenolphosphate available from Uniroyal Chemical under the trade designation Polyguard™. The processing aid is purchased from the R.T. Vanderbilt Company in Norwalk Conn. under the trade designation Vanfree™ AP-2. The antioxidant is purchased from Uniroyal Chemical under the trade designation Octamine™.

Following the mixing of the masterbatch, curative agents are added in a second stage mixing process for formation of the raw rubber compound which forms the backing sheet 20 of the mat 12 of the present invention. An exemplary composition of the raw rubber compound formed in this second stage mixing process is provided in Table 1B.

TABLE 1B

| MATERIAL | PARTS BY WEIGHT |
|---|---|
| Masterbatch Blend | 100 |
| Sulfur | 1.25 |
| Stearic Acid | 1 |
| Carbon Black N-550 | 40 |
| Vulkacit Thiaram MS (TMTM) | 0.5 |
| Zinc Oxide | 5 |
| Blowing Agent | 2.5 |

Exemplary compositions of the masterbatch for various additive ratios of SBR to EPDM are provided in Table 2A in a manner similar to that of Table 1A.

TABLE 2A

| | PARTS BY WEIGHT | | |
|---|---|---|---|
| MATERIAL | a | b | c |
| Rubber (SBR) | 40 | 25 | 50 |
| Additive Polymer (EPDM) | 60 | 75 | 50 |
| Stearic Acid | 1 | 1 | 1 |
| Sunolite 240 | 2 | 2 | 2 |
| Zinc Oxide | 5 | 5 | 5 |
| Carbon Black N-550 | 30 | 30 | 30 |
| Carbon Black N-224 | 60 | 60 | 60 |
| Calcium Carbonate | 35 | 35 | 35 |
| Talc | 30 | 30 | 30 |
| Supar 2280 | 80 | 80 | 80 |

After mixing of the SBR masterbatch, curative agents are preferably added in a second stage mixing process for formation of the raw rubber compound which forms the backing sheet 20 of the mat 12 of the present invention. An exemplary composition of the raw rubber compound formed in this second stage mixing process is provided in Table 2B.

TABLE 2B

| MATERIAL | PARTS BY WEIGHT |
| --- | --- |
| Masterbatch Blend | 100 |
| Sulfur | 2 |
| Methyl Zimate | 1.25 |
| Butyl Zimate | 1.25 |
| Dibutyl Thiurea | 2.50 |
| Tellurium Diethyldithiocarbanate | 1 |
| Blowing Agent | 2.0 |

As previously indicated and shown above, the rubber backing sheet 20 may include, and in some cases preferably includes, a blowing agent to effectuate the formation of closed gas cells in the rubber during vulcanization. The blowing agent which is preferably used is a nitrogen compound organic type agent which is stable at normal storage and mixing temperatures but which undergoes controllable gas evolution at reasonably well defined decomposition temperatures. By way of example only and not limitation, blowing agents which may be used include: azodicarbonamide (Celogen™ AZ-type blowing agents) available from Uniroyal Chemical Inc. in Middlebury Conn. and modified azodicarbonamide available from Miles Chemical in Akron, Ohio under the trade designation Porofor™ ADC-K.

It has been found that the addition of such blowing agents at a level of between about 1 and about 5 parts by weight in the raw rubber composition yields a rubber sheet having an expansion factor of between about 50 and 200 percent. It has been further found that this expansion using these materials yields a final vulcanized rubber backing sheet having a specific gravity of less than about 0.98 and preferably between about 0.5 and about 0.98. After the fluxing processes are completed, the uncured rubber compound containing EPDM and the blowing agent is assembled with the pile yarns 14 and carried, layer as previously described. The vulcanization of the rubber backing sheet is then at least partially effected within the press molding apparatus 32 wherein the applied pressure is between 20 and 40 psi. Under the high temperatures and pressure, the nitrogen which is formed by the blowing agent partly dissolves in the rubber. Due to the high internal gas pressure, small closed gas cells are formed within the structure as the pressure is relieved upon exit from the press molding apparatus. In the preferred practice the post cure oven 33 is used to complete the vulcanization of the mat and provide additional stability to the resulting product.

As previously indicated, a primary object of the present invention is to provide enhance resistance to oxidation and ozonation which tend to weaken the carbon—carbon double bonds in the rubber. Analysis was performed on the rubber sheet through empirical testing and viewing the sheet after long-term exposure in an outdoor environment and after a number of washes in a standard industrial scale laundry machine. Upon such environmental exposure and after such cleaning conditions the inventive mat did not show any appreciable damage or degradation in its structure.

EXAMPLE

A rubber sheet material was produced by fluxing together the materials as set forth in Table 1A in a standard rubber internal mixer at a temperatures of about 280° F. to 300° F. for a period of one to two minutes. EPDM additions were varied as shown in Table 1A to yield ratios of EPDM to NBR of 3.0 (75 parts EPDM to 25 parts NBR); 1.5 (60 parts EPDM to 40 parts NBR); and 1.0 (50 parts EPDM to 50 parts NBR). Additions of curative agents as provided in Table 1B were then made. Uncured sheets of the fluxed rubber compounds were then calendared and cured at a temperature of about 290° F. for five (5) minutes under a pressure of about 40 psi and post cured at a temperature of about 290° F. at atmospheric pressure for a period of five (5) minutes. Sample strips of the cured rubber sheets were then viewed empirically for damage and/or degradation. No such problems were evident in the subject inventive mat rubber backing sheet material. Comparative sheets comprising fully cured NBR without EPDM added showed, great deal of degradation and cracking within the sheet structure.

Furthermore, testing was performed to analyze the potential staining capability of the inventive mat backing sheet. After vulcanization and cooling, the inventive floor mat did not exhibit any appreciable staining of contacted surfaces. For instance, the carbon particles within the rubber backing sheet did not rub off onto a handler's skin or within a cardboard container upon transport; upon placement in an area of high pedestrian traffic for a week the floor did not exhibit any appreciable carbon staining from the rubber backing sheet; and upon laundering in, industrial washing machine, the interior of the washing vessel did not exhibit any appreciable carbon staining from the rubber backing sheet. A 1.5 ratio of EPDM to NBR provided the least amount (although all were de minimis) of staining and thus is the preferred embodiment for the inventive floor mat.

While the invention has been described and disclosed in connection with certain preferred embodiments and procedures, these have by no means been intended to limit the invention to such specific embodiments and procedures. Rather, the invention is intended to cover all such alternative embodiments, procedures, and modifications thereto as may fall within the true spirit and scope of the invention as defined and limited only by the appended claims.

What I claim is:

1. A floor mat comprising
    a carrier fabric;
    a pile material tufted into the carrier fabric which forms
        a pile surface on one side of the carrier fabric, wherein
        said pile material is all monofilament nylon fibers
            having deniers of from about 200 to about 400; and
    a vulcanized expanded backing sheet of rubber integrated
        to the other side of the carrier fabric, wherein
        said rubber backing is comprised of carbon particles
            and
        a mixture of rubber compounds selected from the group
            consisting of NBR and EPDM, SBR and EPDM, and
            SBR, NBR, and EPDM; and
        optionally, a blowing agent to produce a foam rubber
            having a closed cell structure;
        wherein said floor mat possesses suitable flexibility to
            be laundered on a regular basis in an industrial
            washing machine without appreciably damaging said
            mat or said machine; and
        wherein said floor mat will not transfer an appreciable
            amount of said carbon particles from said rubber
            backing sheet to any surfaces in which it comes into
            contact.

2. The floor mat of claim 1 wherein
    the nylon fibers are comprised of nylon-6; and
    the rubber backing comprises from about 50 to about 75%
        EPDM and from about 25 to about 50% NBR.

3. The floor mat of claim 1 wherein
    the nylon fibers are comprised of nylon-6,6; and
    the rubber backing comprises from about 50 to about 75%
        EPDM and from about 25 to about 50% NBR.

4. The floor mat of claim 1 wherein the nylon fibers are comprised of mixtures of nylon-6 and nylon-6,6;

and the rubber backing comprises from about 50 to about 75% EPDM and from about 25 to about 50% NBR.

5. The floor mat of claim 1 wherein the nylon fibers are comprised of nylon-6; and the rubber backing comprises from about 50 to about 75% EPDM and from about 25 to about 50% SBR.

6. The floor mat of claim 1 wherein the nylon fibers are comprised of nylon-6,6; and the rubber backing comprises from about 50 to about 75% EPDM and from about 25 to about 50% SBR.

7. The floor mat of claim 1 wherein the nylon fibers are comprised of mixtures of nylon-6 and nylon-6,6;

and the rubber backing comprises from about 50 to about 75% EPDM anci from about 25 to about 50% SBR.

8. The floor mat of claim 1 wherein the nylon fibers are comprised of nylon-6; and the rubber backing comprises about 60% EPDM and about 40% NBR.

9. The floor mat of claim 1 wherein the nylon fibers are comprised of nylon-6,6; and the rubber backing comprises about 60% EPDM and about 40% NBR.

10. The floor mat of claim 1 wherein the nylon fibers are comprised of mixtures of nylon-6 and nylon-6,6;

and the rubber backing comprises about 60% EPDM and about 40% NBR.

11. The floor mat of claim 1 wherein the nylon fibers are comprised of nylon-6; and the rubber backing comprises about 60% EPDM and about 40% SBR.

12. The floor mat of claim 1 wherein the nylon fibers are comprised of nylon-6,6; and the rubber backing comprises about 60% EPDM and about 40% SBR.

13. The floor mat of claim 1 wherein the nylon fibers are comprised of mixtures of nylon-6 and nylon-6,6;

and the rubber backing comprises about 60% EPDM and about 40% SBR.

14. The floor mat of claim 1 wherein the rubber backing comprises a mixture of NBR, SBR, and EPDM.

15. The floor mat of claim 1 wherein said blowing agent is present;

wherein said backing sheet possesses a specific gravity of below about 0.98.

* * * * *